United States Patent
Platt et al.

(10) Patent No.: US 11,179,864 B2
(45) Date of Patent: Nov. 23, 2021

(54) RIBBED AND APERTURED FLUOROPLASTIC SUPPORT SHEET FOR A FILTER SUBSTRATE AND METHOD OF MAKING SAME

(71) Applicant: Delstar Technologies, Inc., Middletown, DE (US)

(72) Inventors: Andrew G. Platt, Middletown, DE (US); Joel P. Trojnar, Smyrna, DE (US)

(73) Assignee: DELSTAR TECHNOLOGIES, INC., Middletown, DE (US)

( * ) Notice: Subject to any disclaimer, the term of this patent is extended or adjusted under 35 U.S.C. 154(b) by 1029 days.

(21) Appl. No.: 15/501,217

(22) PCT Filed: Aug. 5, 2015

(86) PCT No.: PCT/US2015/043766
§ 371 (c)(1),
(2) Date: Feb. 2, 2017

(87) PCT Pub. No.: WO2016/022653
PCT Pub. Date: Feb. 11, 2016

(65) Prior Publication Data
US 2017/0225378 A1 Aug. 10, 2017

Related U.S. Application Data (60) Provisional application No. 62/033,683, filed on Aug. 6, 2014.

(51) Int. Cl.
*B26F 1/02* (2006.01)
*B29C 48/35* (2019.01)
(Continued)

(52) U.S. Cl.
CPC ............... *B26F 1/02* (2013.01); *B01D 46/10* (2013.01); *B29C 43/222* (2013.01);
(Continued)

(58) Field of Classification Search
CPC ..... B29C 48/30; B29C 48/35; B29C 48/0022; B29C 48/07; B29C 48/13; B29C 48/0011;
(Continued)

(56) References Cited

U.S. PATENT DOCUMENTS 3,303,771 A * 2/1967 Nesher ...................... F24F 7/10
454/187
3,647,606 A * 3/1972 Notaro .................... B29C 70/24
428/184
(Continued)

FOREIGN PATENT DOCUMENTS

EP 0878292 A1 11/1998
JP S58153630 A 9/1983
(Continued)

OTHER PUBLICATIONS

Pall Corporation (2012). Data Sheet: UltiKleen(TM) Excellar ER JKC Assemblies, pp. 1-3.
(Continued)

*Primary Examiner* — Francisco W Tschen
*Assistant Examiner* — Guy F Mongelli
(74) *Attorney, Agent, or Firm* — Caesar Rivise, PC (57) ABSTRACT

A filter support sheet extruded from a fluoroplastic material includes a base section having spaced-apart ribs extending outwardly from at least one surface thereof. Segments between spaced-apart ribs provide flow channels and apertures are punched through the sheet in a predetermined pattern unaffected by the structure of the support sheet. A method includes the steps of: (1) extruding a thermoplastic, fluoroplastic material to form of a sheet; (2) passing the
(Continued)

sheet through a nip region provided by opposed rollers; at least one having an outer surface with counter-sunk grooves. Counter-sunk grooves in one roller are aligned with an outer surface or counter-sunk grooves of the other roller in the nip region to form a ribbed sheet having ribs upstanding from at least one surface of said sheet; (3) setting the ribbed sheet and (4) punching apertures through the ribbed sheet in a predetermined pattern.

13 Claims, 6 Drawing Sheets

(51) Int. Cl.
| | | |
|---|---|---|
| *B01D 46/10* | (2006.01) | |
| *B29C 48/12* | (2019.01) | |
| *B29C 48/00* | (2019.01) | |
| *B29C 48/13* | (2019.01) | |
| *B29C 48/07* | (2019.01) | |
| *B29C 48/08* | (2019.01) | |
| *B29C 43/22* | (2006.01) | |
| *B29K 27/18* | (2006.01) | |
| *B29K 27/12* | (2006.01) | |
| *B29C 48/305* | (2019.01) | |

(52) U.S. Cl.
CPC ...... *B29C 48/0011* (2019.02); *B29C 48/0022* (2019.02); *B29C 48/07* (2019.02); *B29C 48/08* (2019.02); *B29C 48/12* (2019.02); *B29C 48/13* (2019.02); *B29C 48/35* (2019.02); *B01D 2265/06* (2013.01); *B01D 2275/105* (2013.01); *B29C 48/00* (2019.02); *B29C 48/305* (2019.02); *B29K 2027/12* (2013.01); *B29K 2027/18* (2013.01)

(58) Field of Classification Search
CPC ..... B29C 48/12; B29C 43/222; B29C 48/305; B29C 48/00; B01D 46/10; B01D 2265/06; B01D 2275/105; B26F 1/02; B29K 2027/12; B29K 2027/18
USPC ...................................... 264/210.7
See application file for complete search history.

(56) References Cited

U.S. PATENT DOCUMENTS

| | | | | |
|---|---|---|---|---|
| 3,727,769 A * | 4/1973 | Scholl | ................... | B01D 46/10 |
| | | | | 210/484 |
| 3,746,607 A * | 7/1973 | Harmon | ............ | A61F 13/00008 |
| | | | | 428/167 |
| 3,812,972 A * | 5/1974 | Rosenblum | .......... | B01D 25/001 |
| | | | | 210/489 |
| 3,906,073 A * | 9/1975 | Kim | ...................... | B29C 43/222 |
| | | | | 264/147 |
| 4,101,358 A | 7/1978 | Kim et al. | | |
| 4,692,287 A * | 9/1987 | Timmons | ................... | C08J 9/26 |
| | | | | 264/127 |
| 4,798,604 A | 1/1989 | Carter | | |
| 5,094,749 A * | 3/1992 | Seita | ................... | B01D 63/084 |
| | | | | 210/321.75 |
| 5,207,962 A | 5/1993 | Hovis et al. | | |
| 5,630,940 A * | 5/1997 | Van Rossen | ....... | B01D 46/0036 |
| | | | | 210/484 |
| 5,714,107 A | 2/1998 | Levy et al. | | |
| 5,776,343 A * | 7/1998 | Cullen | ............... | B01D 39/1692 |
| | | | | 210/483 |
| 6,207,091 B1* | 3/2001 | Kanamoto | ............. | B29C 55/00 |
| | | | | 264/173.11 |
| 6,238,467 B1* | 5/2001 | Azarian | ............. | B01D 46/0023 |
| | | | | 96/135 |
| 6,458,446 B1* | 10/2002 | Andronaco | ......... | B29C 37/0082 |
| | | | | 428/161 |
| 7,736,688 B2 | 6/2010 | Oetjen et al. | | |
| 8,241,543 B2 | 8/2012 | O'Donnell et al. | | |
| 8,563,114 B2 | 10/2013 | Manninen | | |
| 8,575,417 B2 | 11/2013 | Oetjen et al. | | |
| 2001/0037982 A1 | 11/2001 | Pulek | .................... | B01D 29/111 |
| | | | | 210/767 |
| 2002/0146540 A1 | 10/2002 | Johnston et al. | | |
| 2003/0089236 A1* | 5/2003 | Zhang | ..................... | B03C 3/155 |
| | | | | 96/59 |
| 2003/0160375 A1* | 8/2003 | Purcocks | .................. | B26F 1/02 |
| | | | | 270/58.07 |
| 2004/0060858 A1* | 4/2004 | Lucas | .................... | B01D 29/21 |
| | | | | 210/338 |
| 2004/0084402 A1* | 5/2004 | Ashmead | ......... | G01N 27/44708 |
| | | | | 216/27 |
| 2004/0112213 A1* | 6/2004 | Dominiak | .............. | B01D 46/10 |
| | | | | 95/90 |
| 2008/0206529 A1 | 8/2008 | Ueminami et al. | | |
| 2008/0245041 A1* | 10/2008 | Choi | .................... | B01D 39/163 |
| | | | | 55/524 |
| 2014/0174296 A1* | 6/2014 | Schultz | .............. | B01D 46/0004 |
| | | | | 96/226 |
| 2014/0298612 A1* | 10/2014 | Williams | .............. | A47L 7/0004 |
| | | | | 15/347 |
| 2016/0175744 A1* | 6/2016 | Lucas | .................. | B01D 29/012 |
| | | | | 210/806 |
| 2017/0204520 A1* | 7/2017 | Forstpointner | ......... | C23C 24/04 |

FOREIGN PATENT DOCUMENTS

| | | | | |
|---|---|---|---|---|
| JP | H06206265 A | | 7/1994 | |
| JP | 2002028458 A | | 1/2002 | |
| WO | 9110415 A2 | | 7/1991 | |
| WO | WO-9740918 A1 * | | 11/1997 | .......... B01D 46/525 |
| WO | 0128754 A1 | | 4/2001 | |
| WO | 2007017112 A1 | | 2/2007 | |
| WO | WO 2007/017112 | * | 2/2007 | ............ B01D 29/23 |
| WO | WO-2007017112 A1 * | | 2/2007 | ............ B01D 25/24 |

OTHER PUBLICATIONS

English language abstract of JP H06206265 A (1994).
International Search Report from PCT/US2015/043766 dated Nov. 16, 2015.
European Search Report for Application No. 18191412.8 dated Dec. 2018.
Machine Translation of JP 2002028458.

* cited by examiner

RIBBED AND APERTURED FLUOROPLASTIC SUPPORT SHEET FOR A FILTER SUBSTRATE AND METHOD OF MAKING SAME

CROSS-REFERENCE TO RELATED APPLICATIONS

This international application claims the benefit under 35 U.S.C. § 119(e) of U.S. Patent Application Ser. No. 62/033,683, filed Aug. 6, 2014, entitled RIBBED AND APERTURED FLUOROPLASTIC SUPPORT SHEET FOR A FILTER SUBSTRATE AND METHOD OF MAKING SAME, the disclosure of which is incorporated by reference herein.

FIELD OF THE INVENTION

This invention relates to a ribbed and apertured support sheet for a filter substrate extruded from a thermoplastic, fluoroplastic material and to a method of making same.

BACKGROUND OF THE INVENTION

Filter members employing filter media supported on each side by an embossed and apertured support sheet are known in the art. These filter members are commonly employed in cartridge filters for filtering particulate material in a variety of cleaning operations.

Filter members for use in cleaning semiconductor components preferably include support sheets made of a fluoroplastic material and most preferably such sheets are apertured to permit filtrate to pass through the sheets into underlying filter media. However, it has been difficult to extrude, emboss, and aperture a thermoplastic fluoroplastic material into a bi-planar sheet by conventional means.

On prior art approach for forming embossed and apertured webs from a fluoroplastic material is disclosed in Cullen et al. U.S. Pat. No. 5,776,343. The method disclosed in this patent has a number of deficiencies and has not been entirely satisfactory in form the desired pattern of apertures in the sheet.

The fluoroplastic, pleated and apertured sheet disclosed in the Cullen '343 patent is formed by embossing an extruded sheet between a smooth surfaced roll and an opposed roll having projections extending therefrom and completely surrounded by proximal, flat surfaces. This embossing step provided two, interrelated functions. First, it pleated the polymeric sheet film in a specific pattern dictated by the pattern of the projections on the embossing roll opposed to the smooth surface roll. Second it established the location of apertures to be formed in the sheet by a subsequent orientation step. To further explain, the projections on the embossing roll either slit the sheet or provided thin, weakened regions. Upon biaxially stretching the sheet the slits or weakened regions were at least partially opened or perforated to form apertures. Thus, it should be apparent that the embossing operation was responsible both for the embossed, pleated pattern in the sheet and the arrangement of apertures formed therein. The method disclosed in the '343 patent, while producing a pleated, apertured web, did not produce the most clearly formed apertures. Moreover, the pattern of apertures formed in the sheet was dictated by the pattern of raised projections in one of the embossing rolls, which also dictated the pattern of pleats formed in the sheet. Thus, the process disclosed in the '343 patent did not provide the desired degree of flexibility of establishing a predetermined pattern of apertures independent of establish a three dimension configuration in the sheet.

U.S. Pat. No. 8,563,114, assigned to Astenjohnson, Inc., generally discloses and embossed and apertured sheet but is not directed to a high purity, fluoroplastic support sheet employed as part of a filter member. In the process disclosed in the '114 patent slits are cut into a substrate, which can be either paper or a polymer, and then regions between the slits are raised above the plane to form a multitude of bridges or overpasses between the slit regions. The apertures run parallel to the sheet plane; not in the Z-direction through the plane. A Z-direction force imposed by the filtrate on the substrate disclosed in the '114 will tend to flatten out the substrate and close the apertures or slits. In addition, the method employed in the '114 patent requires the use of a preexisting film and does not suggest the forming of a patterned sheet formed or cast from a molten fluoroplastic material.

Attempts were made to form desired, ribbed and apertured support sheets in accordance with the teachings in Hovis et al. U.S. Pat. No. 5,207,962, but that process had only limited commercial success and was unable to be used to provide a patterned, rib structure with ribs being continuous in the machine direction of formation.

Other prior art disclosing embossed and apertured webs are the following:

| | | |
|---|---|---|
| i. | U.S. Pat. No. 4,798,604 | Carter |
| ii. | EP 0 509 012 | Carter |
| iii. | U.S. Pat. No. 8,241,543 | O'Donnell et al. |
| iv. | U.S. 2008/0206529 | Ueminami et al. |
| v. | U.S. Pat. No. 8,575,417 | Oetjen et al |
| vi. | U.S. 2002/0146540 | Johnston et al. |
| vii. | U.S. Pat. No. 7,736,688 | Oetjen et al |

All of the prior art documents disclosed herein are fully incorporated by reference herein.

However, none of the above patents disclose or suggest a 3-dimensional patterned (ribbed) and apertured, fluoroplastic support sheet of a filter member wherein a three-dimensional ribbed pattern is formed in the sheet prior to forming the apertures therein and wherein the apertures are formed in a predetermined pattern that is unaffected by the 3-dimensional pattern of ribs in the fabric. However, this invention relates to this latter described structure of a filter support sheet and its method of manufacture.

SUMMARY OF THE INVENTION

A support sheet for a filter substrate is extruded from a thermoplastic, fluoroplastic material and includes a planar, continuous base section having opposed outer surfaces and spaced-apart ribs extending outwardly from said at least one outer surface thereof. The ribs each include an outer distal end and an inner proximal end; said inner proximal end being continuous with an outer surface of said base section. Spaced-apart ribs cooperate with an outer surface from which they extend to provide outer surface segments between adjacent ribs providing continuous flow channels bound by said adjacent spaced-apart ribs for fluid containing material to be filtered. The support sheet includes apertures punched through the entire thickness thereof in a predetermined pattern unaffected by the structure of the support sheet, said predetermined pattern including apertures extending through ribs and outer surface segments between ribs, said ribbed and apertured sheet directing fluid containing material to be filtered along channels and through apertures into said filter substrate.

In one preferred embodiment, the support sheet for the filter substrate of claim includes spaced-apart ribs extending outwardly from both outer surfaces of the continuous base section of the sheet.

In a preferred embodiment, the plurality of channels between adjacent ribs extends linearly along the support sheet.

In a preferred embodiment, the support is a cast, unoriented structure.

A method of this invention for forming support sheet for a filter structure includes the steps of: (1) extruding a substrate of a thermoplastic, fluoroplastic material through an extrusion die in the form of a continuous sheet and prior to setting said sheet; (2) passing the sheet through a nip region provided by opposed rollers having outer surfaces, said outer surfaces being free of projections extending outwardly therefrom, at least one of said outer surface including counter-sunk grooves therein, said counter-sunk grooves in one of said rollers being aligned with an outer surface or counter-sunk grooves of said other of said rollers in the nip region, whereby said continuous sheet is formed into a ribbed sheet having a planar, continuous base section and upstanding ribs extending outwardly from at least one outer surface of said base sheet; (3) setting said ribbed sheet; and thereafter, (4) punching apertures through the entire thickness of said ribbed sheet in a predetermined pattern.

In a preferred method the ribbed sheet is a cast sheet that is unoriented in either the machine-direction or cross-machine-direction thereof.

BRIEF DESCRIPTION OF THE DRAWING

The invention may be more fully understood with reference to the accompanying drawings, wherein.

DETAILED DESCRIPTION

Reference throughout this application including the claims to the apertures being punched through the entire thickness thereof "in a predetermined pattern unaffected by the structure of the support sheet" means that the support sheet is not embossed or otherwise provided with slits or weakened regions that are intended to constitute the regions in which apertures are created or formed. The predetermined pattern of apertures in this invention may very well be set, selected or determined by the structure of the ribbed sheet, but the structure of the ribbed sheet is not responsible for providing or establishing the predetermined pattern of apertures. In the preferred embodiment the predetermined pattern of apertures is provided by a predetermined pattern of punch members in a punch press used to create the apertures in the ribbed sheet.

Reference throughout this application to "filter media" or "filter substrate" being a component of the filter member of this invention can be of any desired configuration or composition for carrying out the desired filtering operation. For example, and not by way of limitation, the filter media can be either a single layer or a multilayer structure and can be formed from melt blown layers, spun bond layers, other non-woven layers and combinations thereof.

Figure 1:
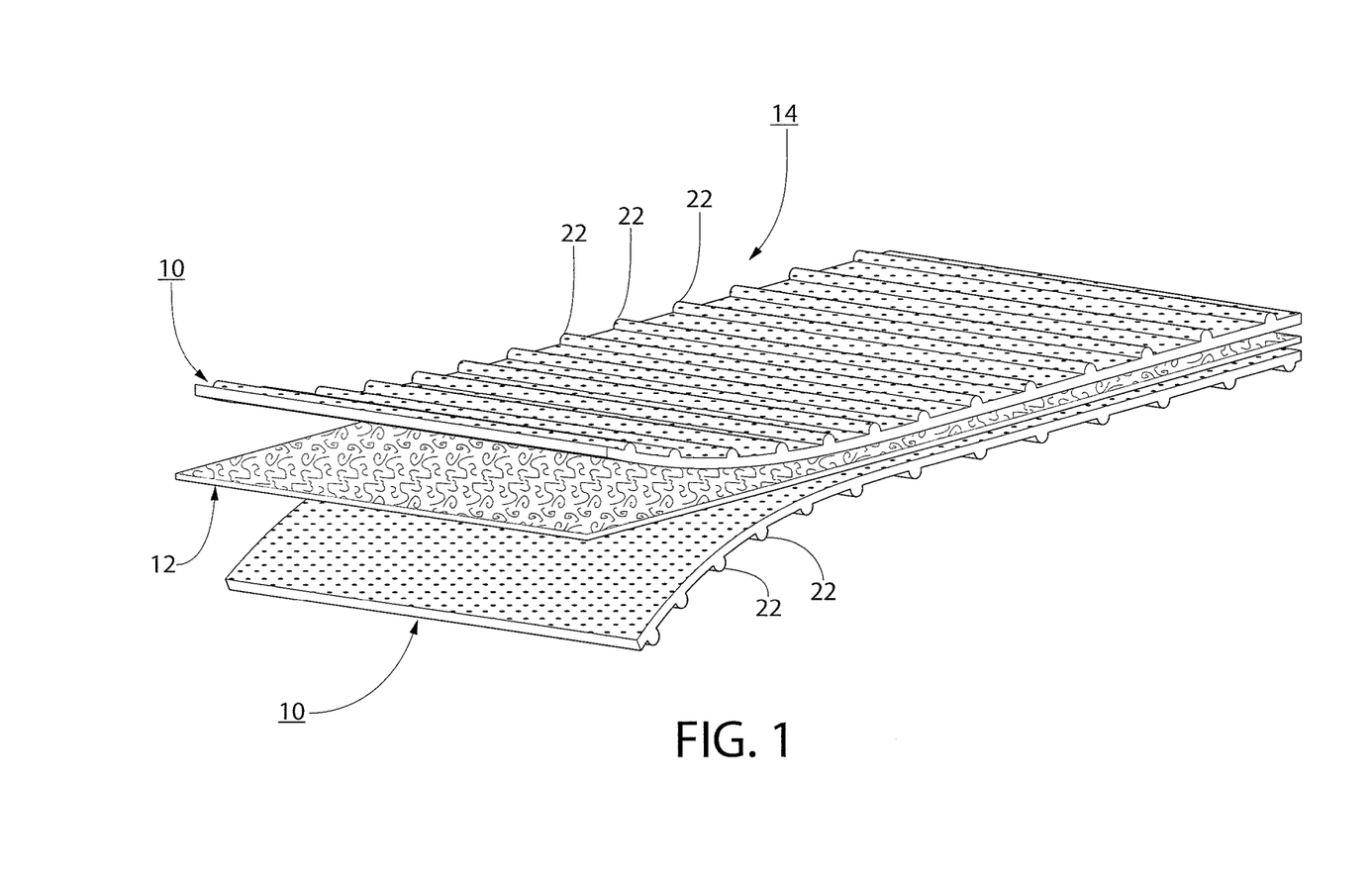
FIG. 1 is schematic, isometric view showing a three-layer filter member including a filter substrate sandwiched between two support sheets.

Referring to FIG. 1, filter support members 10 in accordance with this invention support an internal filter substrate 12 to form a composite filter member 14. The filter support members 10 can be of identical constructions; formed from an extruded sheet of a thermoplastic, extrudable fluoroplastic material, most preferably a perfluoroalkoxy (PFA) polymer sold under the designation Neoflon® by Daikin. However, other fluoroplastics may be usable in this invention, e.g., ethylenechlorotrifluorethylene (ECTFE); ethylenetetrafluoroethylene (ETFE) or polyvinylidene fluoride (PVDF).

It has been recognized that a fluoroplastic material such as PFA is highly desirable for use in filters intended to clean semiconductor components and in other environments where extreme cleanliness is required and the possibility of contamination is minimized. Moreover the support members 10 need to be designed to both direct fluids to be filtered along their surfaces and also for directing the fluids through the structure into the underlying filter substrate 12 to remove undesired particulates from the filtrate.

Although the filter support members depicted in FIG. 1 are designated generically as "10" it should be understood that these members can be of on any of the arrangements/configurations described hereinafter, including but not limited to the arrangements illustrated in FIGS. 2A, 2B and 2C, as well as an arrangement of skewed ribs on opposed sides of the continuous base section of the support member. Moreover, as shown in FIG. 1, the support members 10 include ribs 22 disposed outwardly from only one side of said member. As illustrated the ribs 22 face outwardly of the composite filter member 14. However, if desired the support members 10 can be reversed to position the spaced-apart ribs in engagement with the internal filter substrate 12. The orientation of the ribs 22 relative to the internal filter substrate 12 is a matter of customer preference.

Figure 2A:
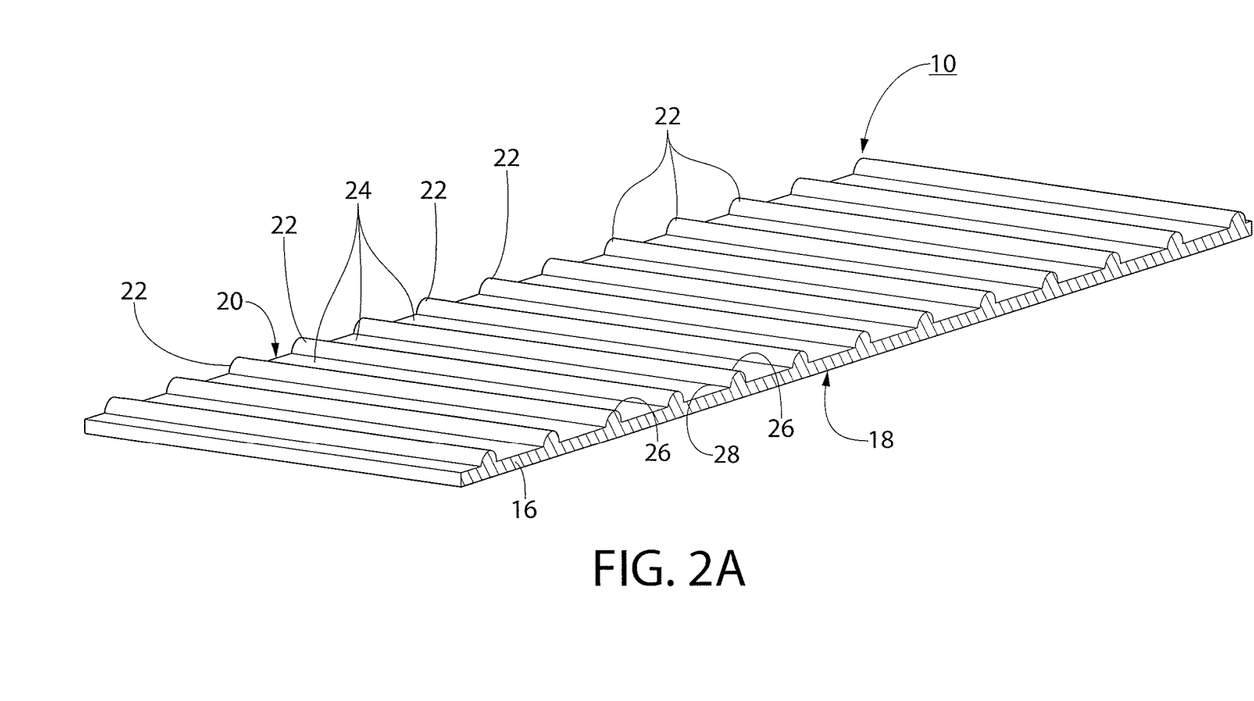
FIGS. 2A-2C are isometric views showing different embodiments of support sheets of this invention at an intermediate stage of formation; with ribs extruded therewith in different arrangements/patterns, but prior to such support sheets being apertured.
Figure 4A:
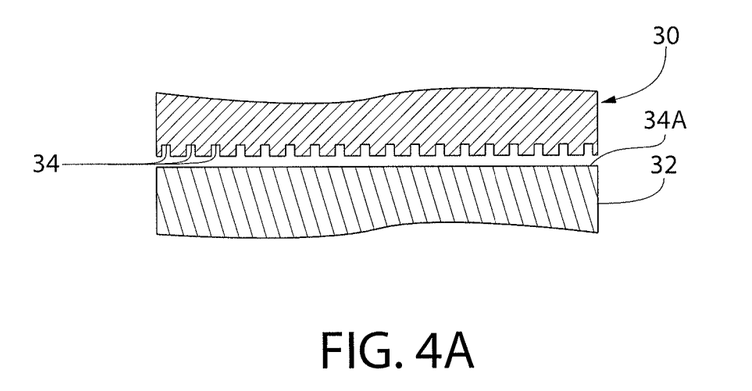
FIGS. 4A-4C show cooperating pattern rolls with different arrangements of pockets to vary the rib structure in the support sheet for forming the embodiments of support sheets illustrated in FIGS. 2A-2C respectively.

Referring to FIG. 2A, the support member 10 in accordance with one embodiment of this invention is shown in an intermediate stage of formation; after being passed through a nip provided by opposed rolls 30, 32; one roll, e.g., 30 having axially spaced-apart pockets 34 extending circumferentially around its periphery and cooperating with a smooth-surfaced, opposing roll, e.g., 32 (FIG. 4A). Thereafter the support member 10 is set to be processed further. At this stage of formation the support member 10 is a ribbed substrate including a continuous base section 16 having opposed outer surfaces 18, 20, and spaced-apart ribs 22 extending outwardly from outer surface 20, whereby outer surface segments 24 between adjacent spaced-apart ribs 22 provide continuous fluid directing or flow channels for fluids containing particulates to be filtered therefrom.

Figure 2B:
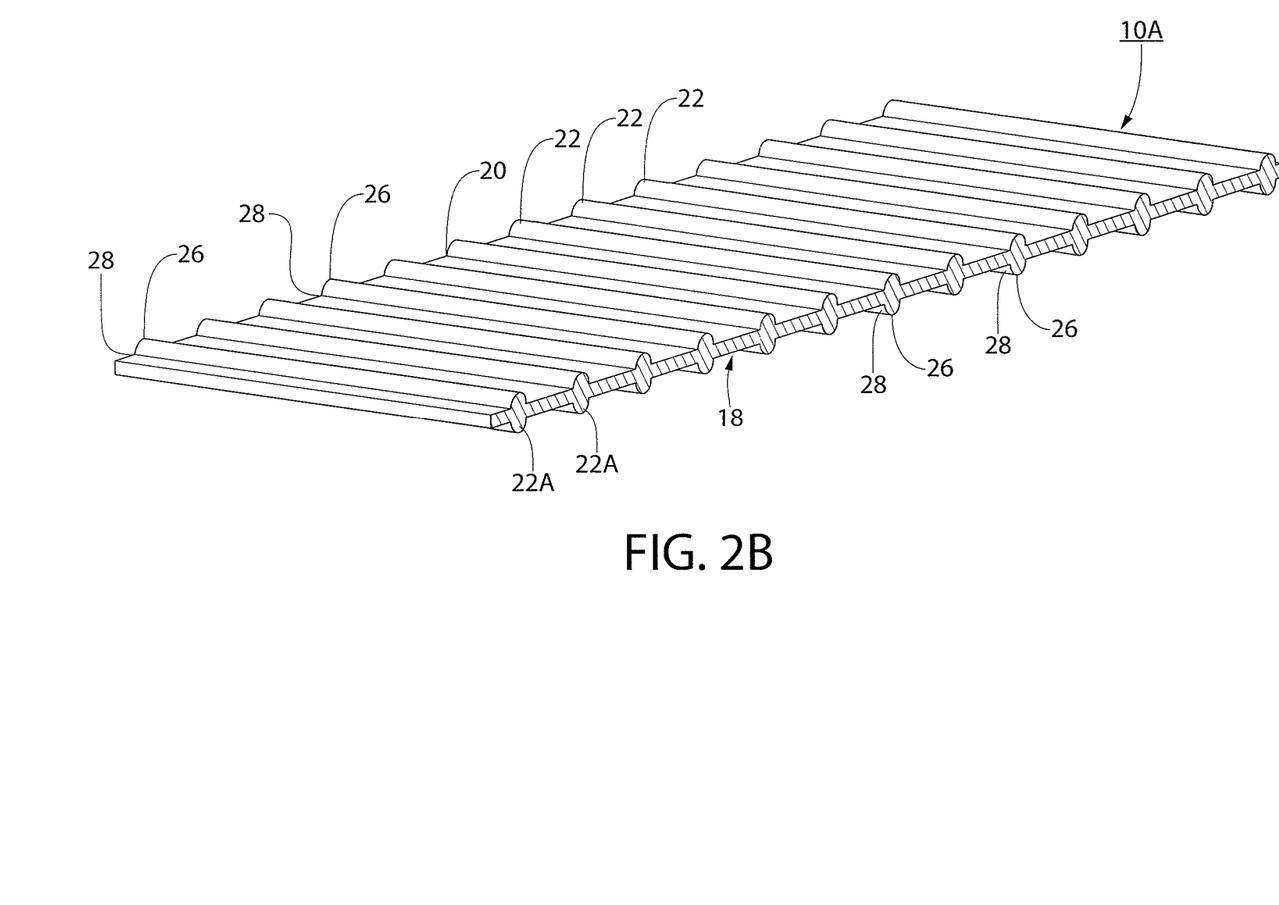
Figure 2C:
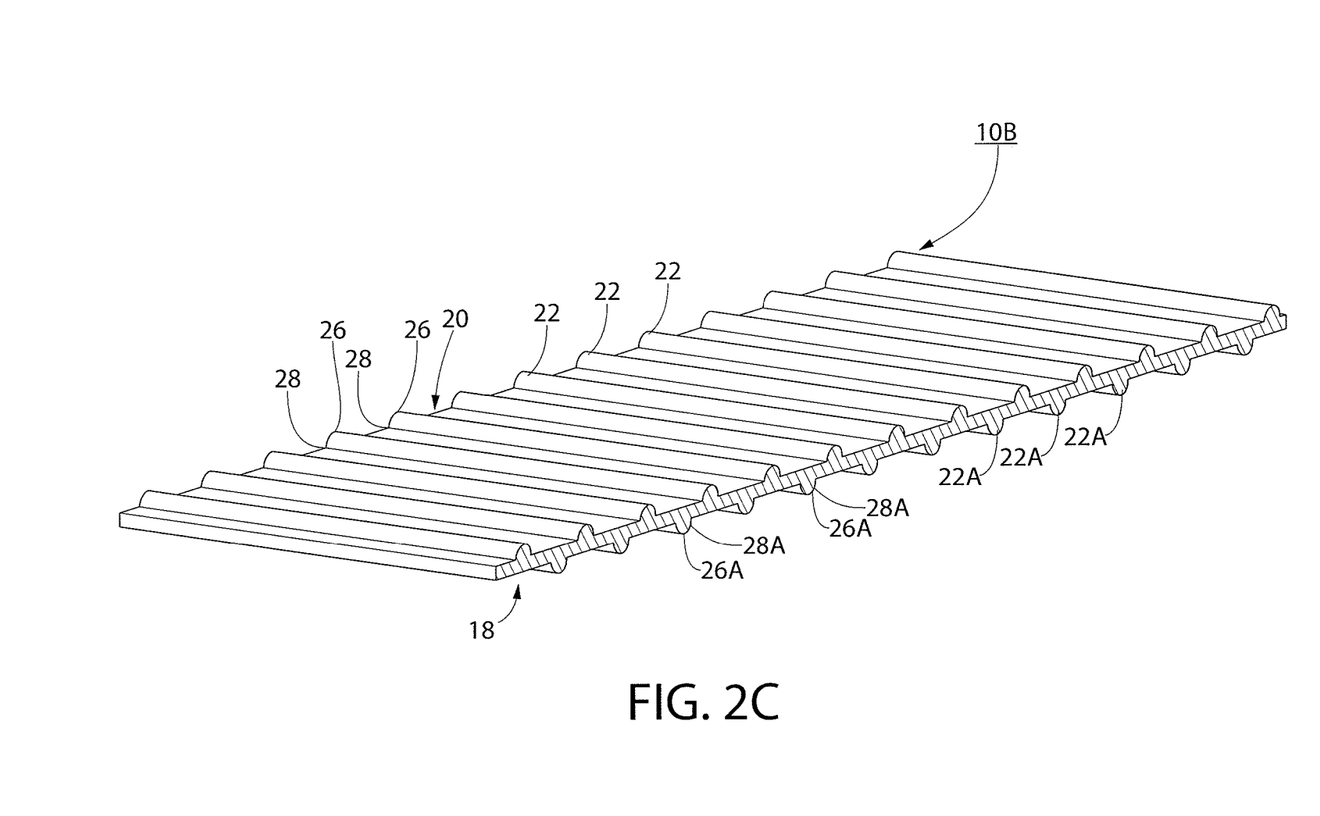

Referring to FIG. 2B, in an alternative embodiment of the support member 10A, spaced-apart ribs 22A also can be provided projecting outwardly from outer surface 18 of the base section 16; either in vertical alignment with ribs 22, as illustrated in FIG. 2B, or transversely offset with respect to such ribs 22, as illustrated in FIG. 3C. It should be noted that the arrangement of ribs 22A illustrated in FIGS. 2B and 2C are formed with the use of the pattern rolls 30A, 32A and 30B, 32B, respectively, and as will be described in greater detail hereinafter.

Other arrangement of ribs can be provided. For example, and not by way of limitation, ribs 22 and/or 22A can be formed in a skewed pattern across the sheet as the sheet is passed through the nip of a specially designed set of pattern rolls (not shown). The formation of pockets or grooves in pattern rolls to provide skewed ribs should be easily accomplished by a person skilled in the art; based on the disclosure herein.

Referring again to FIG. 2A, each of said ribs 22 include an upper distal end 26 and an inner, proximal end 28, and each rib 22 is a continuous extension from base section 16. As can be seen in FIGS. 2B and 2C, the ribs 22A have the same arrangement of distal and proximal ends 26A, 28A as the distal and proximal ends 26, 28 of the ribs 22.

It should be noted that the ribbed filter support members 10, 10A and 10B, as well as other ribbed support members within the scope of this invention, are not pleated structures having projections including underlying recesses complimentary in shape to the projections. In fact, the ribbed structures 10, 10A and 10B, as well as other ribbed structures in accordance with this invention all have a continuous, planar base sections. Also the ribbed filter support members 10, 10A and 10B, as well as other ribbed support members within the scope of this invention, do not include any predetermined pattern of weakened regions or slits in the originally formed sheet to affect the location or pattern of apertures that subsequently is formed therein.

Figure 3A:
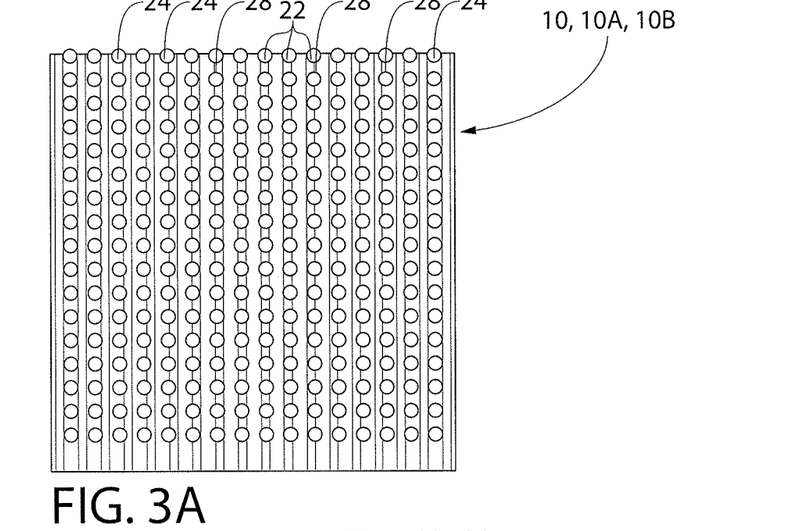
FIG. 3A is a plan view of the support sheet of this invention showing the arrangement of ribs and apertures in the structure without stretching the sheet.

Referring to FIG. 3A, after formation of the ribs 22 and/or 22A in the extruded substrate, the substrate is set; preferably without either longitudinal or transverse stretching. This cast substrate can then be wound into a roll and subsequently unwound and directed through a punch press to form apertures 28 through the Z-direction thereof in a desired, predetermined pattern (FIG. 3A). Alternatively, the sheet, after being set, can be directed in a continuous operation through a punch press to form the predetermined pattern of apertures 28 therein. This predetermined pattern can provide apertures 28 extending both through channel sections, e.g., 24, of the substrate and ribbed sections, e.g., 22 of the substrate, as desired.

Figure 3B:
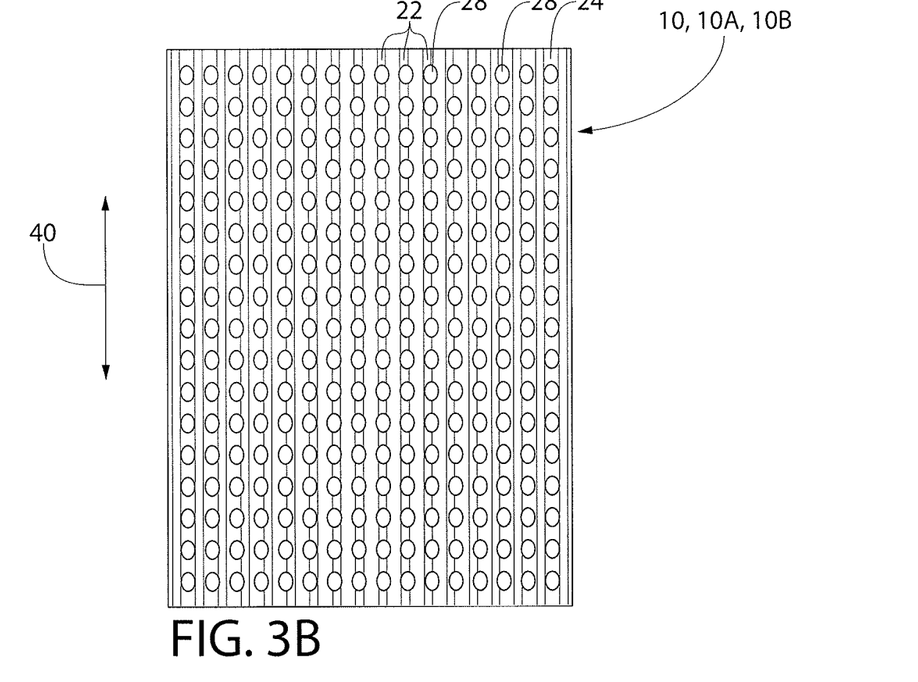
FIG. 3B is a plan view of the support sheet of this invention similar to FIG. 3, but after the sheet has been stretched in the machine direction of formation to elongate the apertures.

Referring to FIG. 3B, after aperturing, the filter support members can be stretched in the machine direction, as indicated by the double-headed arrow 40, to elongate the apertures 28 for providing greater open area for passage of the fluid to be filtered by the filter media or substrate 12. This greater open area is evident by comparing FIG. 3B with the non-elongated filter support member shown in FIG. 3A.

As noted earlier, the three-dimensional configuration of the ribbed substrates of this invention does not affect the actual formation of the apertures 28 therein. The predetermined pattern of apertures 28 is determined by the pattern of punches in a punch press or similar device. This latter pattern may be selected based on the arrangement of ribs 22 and/or 22A in the substrate but there are no weakened regions or slits formed in the ribbed and cast sheet to dictate or predetermine the pattern of apertures formed therein.

Referring to FIG. 4A, the substrate for the filter support member 10 shown in FIG. 2A is extruded in a molten state from a conventional extruder into a substantially planar sheet that is passed through the nip of opposed rolls illustrated schematically and in fragmentary view at 30, 32 to form the ribs 22 projecting outwardly from planar base section 16 thereof.

The roll 30 is a patterned roll with counter sunk grooves 34 circumferentially continuous about the periphery of the roll and spaced-apart from each other along the axial extent of the roll. However, if desired it is within the scope of this invention to form the grooves or pockets discontinuously about the circumference and/or arranged at an acute angle, e.g., skewed to the rotational axis of the roll.

FIG. 4A shows the arrangement of cooperating rolls 30, 32 when ribs, e.g., 22 are only intended to be formed on one side, e.g., side 20 of the planar base 16. As is apparent in FIG. 4A the roll 32 opposed to roll 30 has a continuous peripheral surface 34A free of pockets, projections or other three dimensional patterns.

Figure 4B:
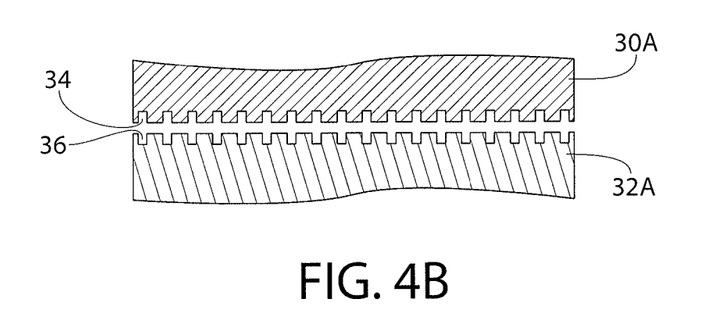

Referring to FIG. 4B, an arrangement of cooperating rolls 30A, 32A is depicted for forming ribs 22 and 22A in alignment with each other and extending from opposed surfaces 20, 18, respectively, of the support member 10A as shown in FIG. 2B. As can be seen in FIG. 4B, opposed rolls 30A, 32A have circumferential, countersunk grooves 34, 36 in axial alignment with each other to form the ribs 22, 22A, in the support member 10A shown in FIG. 2B.

The arrangement of the counter sunk grooves 34 can be selected independently of the arrangement of the counter sunk grooves 36. For example, as shown in FIG. 4B the grooves 34, 36 can be in alignment with each other about the complete circumference of the rolls 30A, 32A, in which case the raised ribs 22, 22A on opposed surfaces of the substrate will be in alignment with each other, as illustrated in FIG. 2B.

Figure 4C:
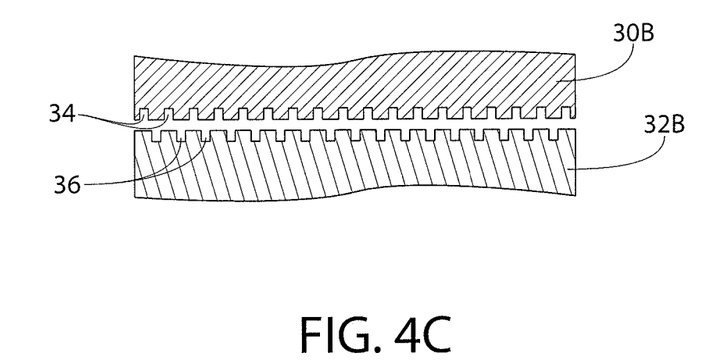

Alternatively, the grooves 36 in roll 32B can be out of axial alignment with the grooves 34 in rolls 30B as shown in FIG. 4C to provide ribs 22 that are out of alignment with ribs 22A.

Thus, the counter-sunk grooves 34, 36 in the roll pairs 30A, 32A (FIG. 4B) and 30B, 32B (FIG. 4C), can be directly over each other, offset with respect to each other and/or skewed relative to each other, depending on the desired flow paths to be established in one or both surfaces of the support members, e.g., 10, 10A, 10B of this invention.

In preferred, non-limiting embodiments of this invention a support member 10, includes 4-60 ribs per inch on one side; more preferably 10-30 ribs per inch and most preferably 20 ribs per inch. The spacing of the ribs may be asymmetrical if so desired. These ribs desirably can be formed in the machine direction of the support members 10, 10A, and 10B. The depth of each of the ribs 22, from the distal end 26 thereof to the proximal end 28 contiguous with the outer surface 20 of planar base section 16, is in the range of 2 to 40 mils; more preferably in the range of 2 to 10 mils and most preferably about 3 mils. The depth of the ribs can be varied over the structure, i.e., they may be asymmetrical if so desired. If desired, the opposed outer surface 18 can have the same arrangement, spacing and dimensions of ribs as extend from outer surface 20.

The important feature in the method of this invention is that there are no sharp projections extending from any of the pattern forming rolls that could provide weakened or slit regions in the extruded substrate or that are intended to pleat the substrate.

Although the filter support members of this invention preferably are non-pleated, cast (non-oriented) sheets it is within the broad scope of the invention to subsequently pleat the support members after they have been provided with ribs and apertures therein. Also, as described in connection with FIG. 3B, it is within the scope of the invention to stretch or orient the support members after they have been apertured Although the present invention has been described in connection with preferred embodiments thereof, it will be appreciated by those skilled in the art that additions, modifications, substitutions and deletions not specifically described may be made without departing from the spirit and scope of the invention defined in the appended claims.

What is claimed is:

1. A filter substrate support sheet for a filter substrate, said filter substrate support sheet being a single, unitary sheet extruded from a thermoplastic, fluoroplastic material and having a predetermined structure including a thickness between opposed surfaces;

said filter substrate support sheet including a planar, continuous base section having opposed outer surfaces and spaced-apart ribs extending outwardly from at least one of said opposed outer surfaces in a desired, predetermined pattern;

said spaced-apart ribs including an outer distal end and an inner proximal end, said inner proximal end being continuous with an outer surface of said planar, continuous base section, said spaced-apart ribs cooperating with an outer surface from which said spaced-apart ribs extend to provide outer surface segments between adjacent ribs providing continuous flow channels bound by said adjacent spaced-apart ribs, said continuous flow channels extending in a direction along said outer surface;

said filter substrate support sheet further including apertures punched through the entire thickness thereof in a predetermined pattern, said predetermined pattern of apertures being provided independently of and unaffected by the desired predetermined pattern of ribs in the filter substrate support sheet, said predetermined pattern of apertures includes apertures extending through the ribs and outer surface segments between the ribs, and said filter substrate support sheet including said ribs and apertures therein directing fluid containing material to be filtered along said continuous flow channels and through said apertures into said filter substrate.

2. The filter substrate support sheet of claim 1, wherein said spaced-apart ribs extend outwardly from both outer surfaces of said continuous base section in a desired predetermined pattern, said predetermined pattern of apertures being independent of and unaffected by the desired predetermined pattern of the ribs extending outwardly from both outer surfaces of said continuous base section.

3. The filter substrate support sheet of claim 1, wherein said plurality of channels between the adjacent ribs extend linearly along said support sheet.

4. The filter substrate support sheet of claim 1, wherein said ribs extend continuously along said support sheet without interruptions therein.

5. The filter substrate support sheet of claim 1, wherein the said support sheet is a cast, unoriented structure.

6. A method of forming the filter substrate support sheet for a filter structure as set forth in claim 1, including the steps of:

Extruding a substrate of a thermoplastic, fluoroplastic material through an extrusion die in the form of a continuous sheet and prior to setting said sheet;

Passing said sheet through a nip region provided between outer surfaces of two rollers opposed to each other, said outer surfaces being free of projections extending outwardly therefrom, at least one of said outer surfaces including counter-sunk grooves therein, said counter-sunk grooves in one of said two opposed rollers being aligned with an outer surface or counter-sunk grooves of said other of said two rollers in the nip region, whereby said continuous sheet is formed into a ribbed sheet having said planar, continuous base section and upstanding ribs extending outwardly from at least one outer surface of said base sheet in a desired;

predetermined pattern,

Setting said ribbed sheet; and thereafter,

Punching apertures through the entire thickness of said ribbed sheet in a predetermined pattern independent from and unaffected by the desired predetermined pattern of the upstanding ribs.

7. The method of claim 6, wherein said set, ribbed sheet is a cast sheet that is unoriented in either the machine-direction or cross-machine-direction thereof.

8. The method of claim 6, wherein outer surfaces of said two rollers opposed to each other include counter-sunk grooves therein, said counter-sunk grooves in each of said two opposed rollers being aligned with an outer surface or counter-sunk grooves of the other of said two opposed rollers wherein the step of passing said sheet through the nip region provided between outer surfaces of said two opposed rollers forms the said ribs on both said outer surfaces of said base sheet.

9. The method of claim 8, wherein said set, ribbed sheet is a cast sheet that is unoriented in the machine-direction or cross-machine-direction of said sheet.

10. The filter substrate support sheet of claim 1, said ribs being included in the range of 4-60 per inch and including a depth from the distal end to the proximal end in the range of 2 to 60 mils.

11. The filter substrate support sheet of claim 1, said ribs being included in the range of 10-30 ribs per inch and including a depth from the distal end to the proximal end in the range of 2 to 10 mils.

12. The filter substrate support sheet of claim 2, said ribs being included in the range of 4-60 ribs per inch and including a depth from the distal end to the proximal end in the range of 2 to 60 mils.

13. The filter substrate support sheet of claim 2, said ribs being included in the range of 10-30 ribs per inch and including a depth from the distal end to the proximal end in the range of 2 to 10 mils.

* * * * *